United States Patent
Covell et al.

(10) Patent No.: US 11,463,437 B2
(45) Date of Patent: Oct. 4, 2022

(54) DEVICE ACTIVATION VERIFICATION

(71) Applicant: International Business Machines Corporation, Armonk, NY (US)

(72) Inventors: Jacob Thomas Covell, New York, NY (US); Robert Huntington Grant, Marietta, GA (US); Jacky Lu, Brooklyn, NY (US); Thomas Jefferson Sandridge, Tampa, FL (US)

(73) Assignee: International Business Machines Corporation, Armonk, NY (US)

( * ) Notice: Subject to any disclaimer, the term of this patent is extended or adjusted under 35 U.S.C. 154(b) by 177 days.

(21) Appl. No.: 16/808,453

(22) Filed: Mar. 4, 2020

(65) Prior Publication Data

US 2021/0281564 A1 Sep. 9, 2021

(51) Int. Cl.
*H04L 9/40* (2022.01)
*H04W 12/12* (2021.01)
*G06N 20/00* (2019.01)

(52) U.S. Cl.
CPC ......... *H04L 63/0876* (2013.01); *G06N 20/00* (2019.01); *H04L 63/102* (2013.01); *H04L 63/20* (2013.01); *H04W 12/12* (2013.01)

(58) Field of Classification Search
CPC ... H04L 63/0876; H04L 63/102; H04L 63/20; H04W 12/12
See application file for complete search history.

(56) References Cited

U.S. PATENT DOCUMENTS

| | | | | |
|---|---|---|---|---|
| 5,923,516 | A * | 7/1999 | Young | H02H 3/207 361/111 |
| 10,917,257 | B2 * | 2/2021 | Delaney | H04L 12/2809 |
| 11,075,933 | B1 * | 7/2021 | Fetters | H04W 12/64 |

(Continued)

FOREIGN PATENT DOCUMENTS

| CN | 108470426 A | 8/2018 |
|---|---|---|
| CN | 209561249 U | 10/2019 |

(Continued)

OTHER PUBLICATIONS

Carman, A., "Smart ovens have been turning on overnight and preheating to 400 degrees", Aug. 14, 2019, 6 pages <https://www.theverge.com/2019/8/14/20802774/june-smart-oven-remote-preheat-update-user-error>.

(Continued)

*Primary Examiner* — Jason Chiang
(74) *Attorney, Agent, or Firm* — Kelsey M. Skodje (57) ABSTRACT

A method can include detecting an activation of a networked device. The method can further include obtaining a hazard score corresponding to a degree of hazard associated with the networked device. The method can further include determining an activation confidence score corresponding to the activation of the networked device. The method can further include determining, based at least in part on the hazard score and the activation confidence score, an adjusted activation confidence score. The method can further include determining that the adjusted activation confidence score exceeds a threshold. The method can further include initiating a deactivation of the networked device in response to the determining that the adjusted confidence score exceeds the threshold.

20 Claims, 6 Drawing Sheets

(56) References Cited

U.S. PATENT DOCUMENTS

| | | | |
|---|---|---|---|
| 2001/0007058 A1* | 7/2001 | Jonsson | A61M 1/367 |
| | | | 604/6.11 |
| 2010/0257490 A1* | 10/2010 | Lyon | H04M 1/724 |
| | | | 715/863 |
| 2011/0184730 A1* | 7/2011 | LeBeau | G10L 15/30 |
| | | | 704/235 |
| 2015/0189377 A1* | 7/2015 | Wheatley | H04N 21/42203 |
| | | | 725/12 |
| 2016/0195859 A1* | 7/2016 | Britt | H04L 12/2816 |
| | | | 700/275 |
| 2016/0197772 A1 | 7/2016 | Britt et al. | |
| 2017/0155703 A1* | 6/2017 | Hao | H04L 67/12 |
| 2018/0082122 A1* | 3/2018 | Verdejo | G06V 20/40 |
| 2018/0249069 A1* | 8/2018 | Rakshit | G06K 9/0063 |
| 2020/0201531 A1* | 6/2020 | Leung | G06F 3/0416 |
| 2020/0249752 A1* | 8/2020 | Parshionikar | G06F 3/04817 |
| 2020/0387603 A1* | 12/2020 | Weldemariam | G06N 3/08 |
| 2021/0021680 A1* | 1/2021 | Aylward | H04L 67/22 |
| 2021/0243595 A1* | 8/2021 | Buck | H04L 63/107 |

FOREIGN PATENT DOCUMENTS

| | | |
|---|---|---|
| DE | 4333442 A1 | 4/1995 |
| DE | 4333442 B4 | 2/2004 |

OTHER PUBLICATIONS

Mell et al., "The NIST Definition of Cloud Computing", Recommendations of the National Institute of Standards and Technology, Sep. 2011, 7 pages.

* cited by examiner

DEVICE ACTIVATION VERIFICATION

BACKGROUND

The present disclosure relates to activation of electronic devices, and more specifically, to device activation verification.

Internet of things ("IoT") devices can be connected to one or more networks and can be controlled based on communication across the one or more networks. For example, devices such as ovens, thermostats, and door locks can be configured to connect to the internet and to receive commands from a user device, such as a remotely located mobile phone. Such commands can trigger operations of the devices, such as preheating an oven, adjusting a room temperature, and unlocking a door.

SUMMARY

According to embodiments of the present disclosure, a method can include detecting an activation of a networked device. The method can further include obtaining a hazard score. The hazard score can correspond to a degree of hazard associated with the networked device. The method can further include determining an activation confidence score. The activation confidence score can correspond to the activation of the networked device. The method can further include determining an adjusted activation confidence score. The adjusted activation confidence score can be based, at least in part, on the hazard score and the activation confidence score. The method can further include determining that the adjusted activation confidence score exceeds a threshold. The method can further include initiating a deactivation of the networked device in response to the determining that the adjusted confidence score exceeds the threshold.

A system and a computer program product corresponding to the above method are also included herein.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to activation of electronic devices; more particular aspects relate to device activation verification. While the present disclosure is not necessarily limited to such applications, various aspects of the disclosure may be appreciated through a discussion of various examples using this context.

A networked device can be a device that is connected to one or more networks and configured to communicate with one or more user devices. For example, networked devices can include devices such as ovens, thermostats, and door locks. Furthermore, user devices can include devices such as mobile phones and computers. Such user devices can be configured to transmit commands to activate one or more networked devices through one or more networks.

For example, in some instances, a user may wish to adjust the temperature of the user's home from a remote location, such as the user's office. In this example, the user can have a mobile phone that includes a software application for the user's thermostat. Using the software application, the user can make a selection on a graphical user interface that causes the mobile phone to transmit a command across one or more networks to the user's thermostat. When received, the command can trigger the thermostat to begin heating the user's home. Thus, the communication between the user device (i.e., mobile phone) and the networked device (i.e., thermostat) can provide a convenient control method when the user's activation of the networked device is intended.

However, in a case in which a user's activation of a networked device is unintended, such activation can cause costly and/or dangerous circumstances. For example, continuing with the thermostat example discussed above, the user can be away from the user's home for several days during the winter. While away from home, the user can unknowingly make contact with an active screen of the user's mobile phone while it is in the user's pocket. As a result, the user can unintentionally select to stop the heating of the user's home. Due to low winter temperatures and the lack of heating, the user can sustain extensive damage to pipes in the user's home. Such damage can be costly and/or dangerous to the user and/or others.

To address these and other challenges, embodiments of the present disclosure include an activation verification system. The activation verification system can determine that an activation of a networked device is an unintended activation, and in response, the activation verification system can initiate a deactivation of the networked device. Accordingly, embodiments of the present disclosure can aid in preventing costly and/or dangerous circumstances that can result from unintended activations of networked devices.

Figure 1:
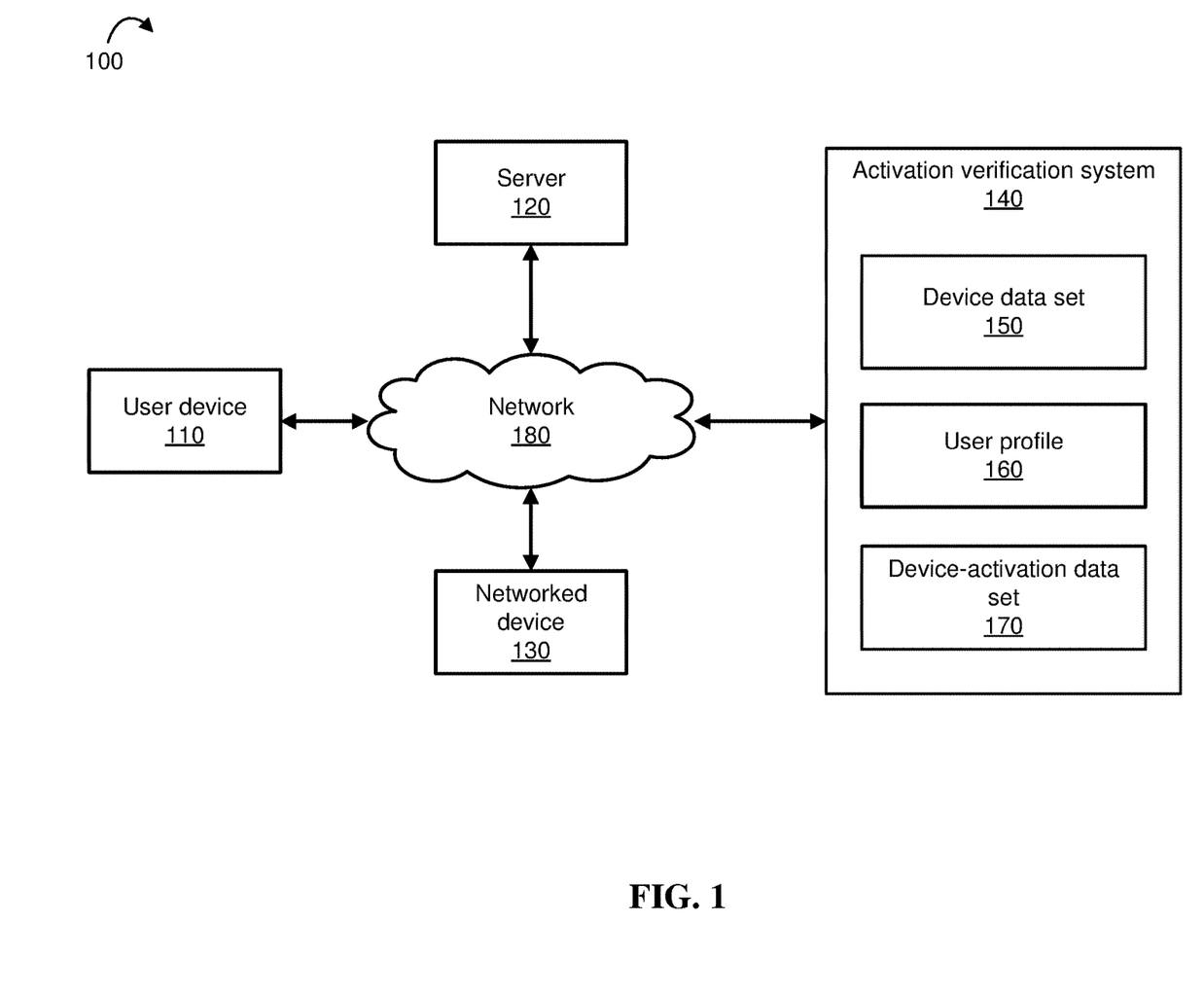
FIG. 1 depicts an example computing environment having an activation verification system, in accordance with embodiments of the present disclosure.

Turning to the figures, FIG. 1 illustrates a computing environment 100 that includes one or more of each of an activation verification system ("AVS") 140, a user device 110, a server 120, a networked device 130, and a network 180. In some embodiments, at least one AVS 140, user device 110, networked device 130, and/or server 120 can exchange data with at least one other through the at least one network 180. For example, in some embodiments, at least one AVS 140, user device 110, networked device 130, and/or server 120 can exchange device data, device-activation data, and/or user data (discussed below) with at least one other through the at least one network 180. One or more of each of the AVS 140, user device 110, networked device 130, server 120, and network 180 can include a computer system, such as the computer system 401 discussed with respect to FIG. 4.

In some embodiments, the AVS 140 can be a software application installed on a computer system of at least one of the user device 110, the networked device 130, and/or the server 120. In some embodiments, the AVS 140 can be integrated into one or more software applications installed on at least one of the user device 110, the networked device 130, and/or the server 120 (e.g., the AVS 140 can be included as a plug-in software component of a software application installed on the user device 110). The AVS 140 can include program instructions implemented by a processor, such as a processor of the user device 110, to perform one or more operations discussed with respect to FIG. 3. In some embodiments, the AVS 140 can be identical or substantially similar to the AVS 220 discussed with respect to FIG. 2.

In some embodiments, the AVS 140 can include one or more of each of a device data set 150, a user profile 160, and a device-activation data set 170. In some embodiments, one or more of each of a device data set 150, a user profile 160, and a device-activation data set 170 can be included on a server 120, a networked device 130, and/or a user device 110. The device data set 150 can include information (e.g., a device name, model number, and/or specifications) corresponding to at least one networked device 130. The user profile 160 can be a data set corresponding to a user. The user profile 160 can include information corresponding to a user, such as a user name, a set of user devices 110 operated by the user, and/or information corresponding to a set of networked devices 130 activated by the user. The device-activation data set 170 can include information such as when and how a networked device 130 has been historically activated.

In some embodiments, server 120 can be a web server accessible by the user device 110 and/or the networked device 130 through the network 180. In some embodiments, the user device 110 can be configured to activate one or more networked devices 130 through the network 180. In some embodiments, the user device 110 can include a device such as a mobile phone, computer (e.g., tablet computer, desktop computer, and/or notebook computer), wearable technology (e.g., smart watch), and/or a voice-command device (e.g., smart speaker). In some embodiments, the networked device 130 can include a device such as an oven, camera, thermostat, automobile ignition, door lock, garage door opener, lamp or lighting system, and the like. In some embodiments, the network 180 can include a wide area network (WAN), a local area network (LAN), the internet, and/or an intranet. In some embodiments, the network 180 can be substantially similar to, or the same as, cloud computing environment 50 discussed with respect to FIG. 5.

Figure 2:
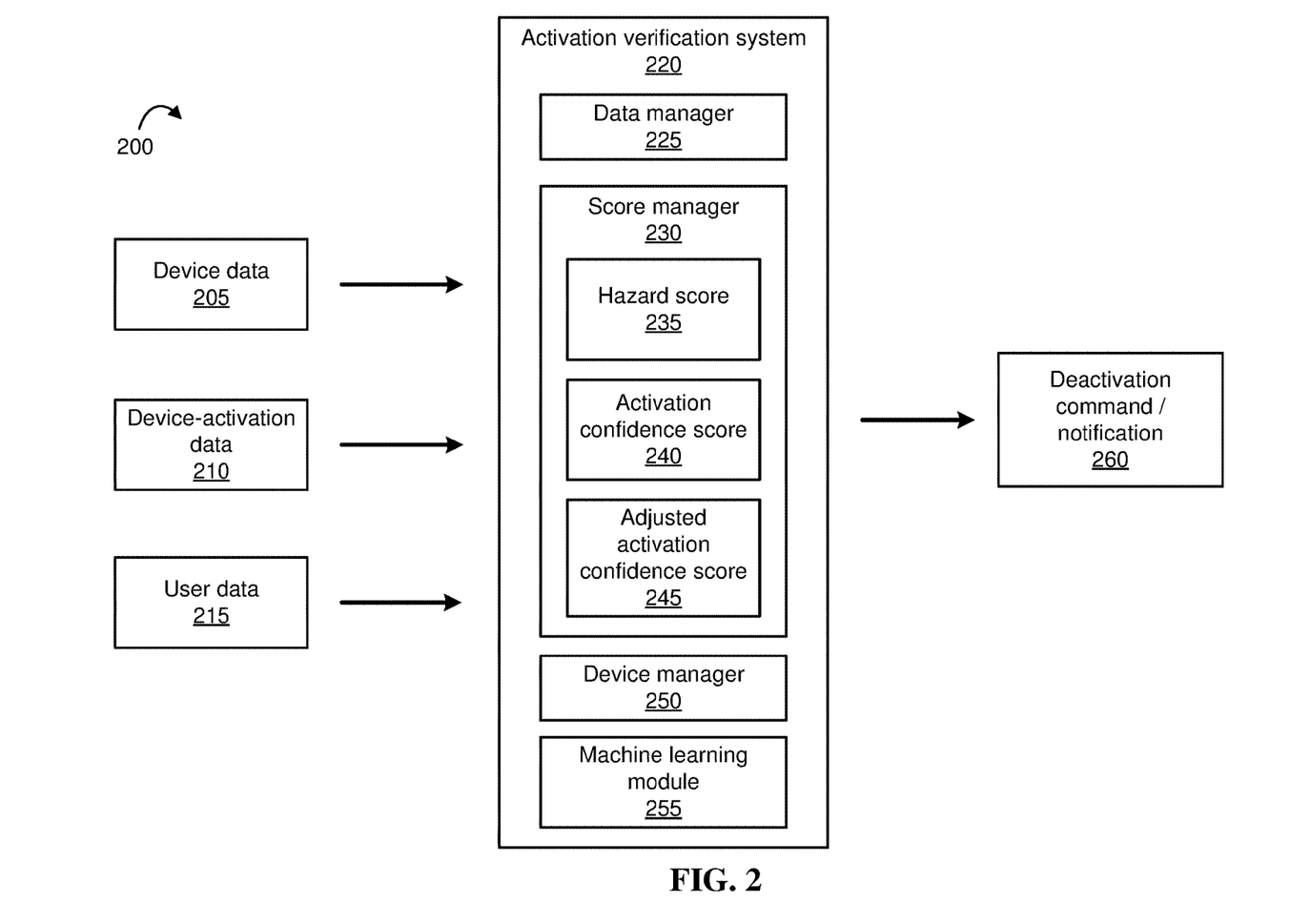
FIG. 2 depicts an example data flow diagram of an activation verification system, in accordance with embodiments of the present disclosure.

FIG. 2 illustrates an example data flow diagram 200 of an AVS 220, in accordance with embodiments of the present disclosure. In data flow diagram 200, the AVS 220 can obtain device data 205, device-activation data 210, and/or user data 215 and can output a deactivation decision and corresponding notification 260.

In some embodiments, the AVS 220 can be identical or substantially similar to the AVS 140 discussed with respect to FIG. 1. In some embodiments, the AVS 220 can include one or more modules, such as data manager 225, score manager 230, device manager 250, and/or machine learning module 255. In some embodiments, one or more of the AVS 220, the data manager 225, score manager 230, device manager 250, and/or machine learning module 255 can include program instructions implemented by a processor, such as processor 410, FIG. 4, to perform one or more operations discussed with respect to FIG. 3. For example, in some embodiments, the data manager 225 can include program instructions to perform operations 305-320, FIG. 3. In another example, in some embodiments, the score manager 230 can include program instructions to perform operations 325-340, FIG. 3. In another example, in some embodiments, the device manager 250 can include program instructions to perform operations 345 and 350, FIG. 3. In another example, in some embodiments, the machine learning module 255 can include program instructions to perform operation 355, FIG. 3. In some embodiments, one or more of the data manager 225, score manager 230, device manager 250, and/or machine learning module 255 can be integrated into a single module.

In some embodiments, device data 205 can include information corresponding to at least one networked device. For example, in some embodiments, device data can include information such as a device name, device category, model number, set of operations performable by the device, and/or specifications of the device. In some embodiments, specifications of the device can include data corresponding to one or more performance characteristics of the device. For example, in some embodiments, such specifications can include data such as a power rating (e.g., an estimate of an amount of power used by the device), additional electrical parameters (e.g., one or more values of voltage, current, and/or frequency) corresponding to the device, and/or one or more operating temperatures of the device. In some embodiments, specifications of the device can include a hazard score, such as hazard score 235, discussed below.

In some embodiments, device-activation data 210 can include information corresponding to one or more activations of one or more networked devices. An activation of a networked device can refer to a triggering of an operation of a networked device. For example, in some embodiments, an activation can include triggering a networked garage-door opener to open a garage door; triggering a networked door lock to transition to an unlocked position from a locked position; triggering a networked oven to begin heating; or triggering a networked lamp to turn on or off. In some instances, an activation can be manual; in some instances, an activation can be network-based.

A manual activation can refer to activating a networked device using a physical interface of the networked device. For example, in some embodiments, a manual activation can include pressing a touchpad of an oven to trigger pre-heating the oven; adjusting a lamp switch to turn on a lamp; or pressing a button of a short-range remote control (e.g., a remote control that emits infrared light) to trigger an operation such as turning on a television.

A network-based activation can refer to activating a networked device through network communication with a user device, such as a mobile phone, tablet, computer, or smart watch. For example, in some embodiments, a network-based activation can include using a mobile phone connected to a network to unlock a door lock that is also connected to the network.

In some embodiments, device-activation data 210 can include present activation data and/or historical activation data. In some embodiments, present activation data can include data corresponding to a current or most-recent-in-time activation of a networked device. For example, when the AVS 220 detects an activation of a networked device, the AVS 220 can obtain present activation data such as identification information (e.g., a name, identification number, image, and/or sound recording) of a user performing the activation. Further in this example, the present activation data can include information such as identification information for a networked device that is activated; a time corresponding to the activation of the networked device; a manner in which the networked device is activated (e.g., whether the networked device is activated by a manual activation or a network-based activation); and/or a location of the user performing the networked device activation. In some embodiments, the AVS 220 can implement image analysis technology, audio analysis technology, and/or natural language processing technology to identify a user or an actor associated with an activation of a networked device. For example, in some embodiments, the AVS 220 can determine that a user manually activated a networked door lock by matching a first image of the user with a second image of the user stored in a user profile. In this example, the first image of the user can be obtained from a networked camera.

Historical activation data can refer to data corresponding to one or more historical activations of one or more networked devices. A historical activation can refer to a previous activation of a networked device (e.g., an activation of a networked device that occurred before a current or most-recent-in-time activation of the networked device). In some embodiments, the AVS 220 can store historical activation data in a device-activation data set, such as device-activation data set 170, FIG. 1. In some embodiments, historical activation data can indicate whether a historical activation was an intended activation or an unintended activation. In some embodiments, historical activation data can include results of analyses by the AVS 220 of one or more activations of one or more networked devices. For example, in some embodiments, a device-activation data set can include historical activation data for a networked car ignition and a networked garage door opener. Continuing with this example, the historical activation data for the networked car ignition can include information such as a number of times the networked car ignition has undergone a network-based activation and/or a time corresponding to each network-based activation. Additionally in this example, the historical activation data for the networked garage door opener can include information such as whether a historical activation of the networked garage door opener was an unintended activation; a number of unintended activations of the networked garage door opener; identification information for a user device from which each unintended activation was initiated; and/or a number of manual activations of the networked garage door opener.

User data 215 can include information corresponding to one or more users who have activated one or more networked devices. In some embodiments, user data 215 can be stored in at least one user profile, such as user profile 160, FIG. 1. In some embodiments, user data 215 can include information such as a user name, user authentication information (e.g., a user image and/or password), and/or profile activation data. Profile activation data can refer to data corresponding to a particular user's one or more activations of one or more networked devices. In some embodiments, profile activation data can be stored in a user profile.

For example, in some embodiments, a first user profile for a first user ("User A") can include profile activation data such as identification information (e.g., a name or identification number) for a set of networked devices that User A has activated. Further in this example, for each of such networked devices, the profile activation data can include information such as a time corresponding to User A's activation of the networked device; a manner in which User A activated the networked device (e.g., whether User A performed a manual activation or a network-based activation of the networked device); and/or a location of User A when the networked device is activated.

In some embodiments, profile activation data can include results of analyses by the AVS 220 of one or more activations of one or more networked devices by a particular user. For example, in some embodiments, profile activation data can include trends identified by the AVS 220, such as a trend that User A typically performs a network-based activation of User A's networked oven at 6 PM from a location corresponding to User A's workplace. In another example, profile activation data can include an identified trend such as that User A has performed a manual activation of User A's networked front door lock for 99% of the total number of activations of the networked front door lock. In some embodiments, such analyses can be performed by the data manager 225. In some embodiments, such analyses can be performed by the machine learning module 255.

In some embodiments, profile activation data can include feedback from a user to the AVS 220, such as a confirmation that an activation of a networked device was an intended activation or an unintended activation. In some embodiments, such feedback can include whether an activation of a networked device was manually performed by the user.

In some embodiments, the data manager 225 can generate one or more data sets (e.g., lists, tables, databases, spreadsheets, and the like) from obtained data, such as device data 205, device-activation data 210, and/or user data 215. In some embodiments, the data manager 225 can be configured to interpret and/or analyze the obtained data.

In some embodiments, score manager 230 can obtain, analyze, and/or interpret values such as one or more hazard scores 235, activation confidence scores 240, and/or adjusted activation confidence scores 245. A hazard score 235 can represent a degree of hazard (e.g., an extent of potential harm, danger, and/or expense) that can result from an unintended activation of a networked device. In some embodiments, a hazard score 235 can be a numerical value. For example, in some embodiments, a hazard score can have a value of 1, 2, or 3. In this example, a hazard score of "1" can represent a lowest degree of hazard, and a hazard score of "3" can represent a highest degree of hazard. For example, in some embodiments, a hazard score of "1" can represent a hazard such as a mere inconvenience and/or an expense of $5 or less. In some embodiments, a hazard score of "2" can represent a hazard such as an expense between $5 and $250. In some embodiments, a hazard score of "3" can represent a hazard such as an expense greater than $250, a risk of significant loss or damage to property (e.g., a risk of theft or destruction to property) and/or a risk of significant injury or death to one or more people. Thus, in this example a networked oven can have a hazard score of "3," due to a hazard of starting a fire, whereas a networked television can have a hazard score of "1," due to a hazard of increasing an electric bill. By utilizing one or more hazard scores, embodiments of the present disclosure can determine whether to initiate a deactivation in view of a degree of potential harm, danger, and/or expense that can affect the user and/or others.

An activation confidence score 240 can refer to a degree of certainty that an activation of a networked device is an intended activation. An intended activation can refer to a deliberate activation of a networked device by a user. For example, in some embodiments, an intended activation can include a user opening a software application on the user's phone and selecting an option to unlock a networked door lock to allow a guest to enter the user's home. In another example, an intended activation can include a user physically moving a switch to turn on a reading lamp so that the user can see pages of a book more clearly. In some embodiments, an activation confidence score can be a numerical value that is directly proportional to a degree of certainty. For example, an activation confidence score of "0" can represent a lowest degree of certainty that an activation of a networked device is an intended activation, and an activation confidence score of "100" can represent a highest degree of certainty that an activation of a networked device is an intended activation.

In contrast, an unintended activation can refer to an inadvertent activation of a networked device. For example, in some embodiments, an unintended activation can include a user unknowingly performing a network-based activation of a networked oven by making haphazard contact with a touchscreen of a mobile phone. In some embodiments, an unintended activation can include an activation by an actor who is unintended by the user. For example, in some embodiments, an unintended activation can include a user's pet manually activating a networked device by contacting a touchpad or switch of the networked device. Additionally, regarding the activation confidence score example above, an activation confidence score of "0" can represent a highest degree of certainty that an activation of a networked device is an unintended activation, and an activation confidence score of "100" can represent a lowest degree of certainty that an activation of a networked device is an unintended activation.

An adjusted activation confidence score 245 can refer to an activation confidence score that accounts for a degree of hazard of a corresponding networked device. For example, in some embodiments, the activation verification system can determine with an activation confidence score of 75% that a user intended a network-based activation of the user's oven. Further in this example, the AVS 220 can determine a hazard score of "3" for the networked oven. Thus, in this example, the AVS 220 can multiply the activation confidence score by the hazard score to obtain an adjusted activation confidence score of 225%. Such an adjusted activation confidence score can represent a weighted value of the activation confidence score that the AVS 220 can use to perform a device activation verification, as described in FIG. 3 below.

In some embodiments, the device manager 250 can manage communication between the AVS 220 and one or more user devices and/or networked devices. In some embodiments, the device manager 250 can initiate a deactivation of a networked device by generating a deactivation command and/or notification 260.

In some embodiments, the AVS 220 can include a machine learning module 255. In some embodiments, the machine learning module 255 can be a processor that includes a machine learning algorithm. The machine learning algorithm can be generated by performing supervised, unsupervised, or semi-supervised training on a data set. In some embodiments, the machine learning module 255 can apply the machine learning algorithm to device data 205, device-activation data 210, and/or user data 215 to predict appropriate values for a hazard score 235, activation confidence score 240, and/or adjusted confidence score 245. In some embodiments, the machine learning module 255 can apply the machine learning algorithm to device data 205, device-activation data 210, and/or user data 215 to predict whether an activation of a networked device is an intended activation. In these embodiments, in response to the machine learning module 255 predicting that an activation of a networked device is not an intended activation, the AVS 220 can initiate a deactivation of the networked device by generating a deactivation command and/or notification 260. In some embodiments, the AVS 220 can obtain user feedback that can be used to train the machine learning module 255.

Machine learning algorithms can include, but are not limited to, decision tree learning, association rule learning, artificial neural networks, deep learning, inductive logic programming, support vector machines, clustering, Bayesian networks, reinforcement learning, representation learning, similarity/metric training, sparse dictionary learning, genetic algorithms, rule-based learning, and/or other machine learning techniques.

For example, the machine learning algorithms can utilize one or more of the following example techniques: K-nearest neighbor (KNN), learning vector quantization (LVQ), self-organizing map (SOM), logistic regression, ordinary least squares regression (OLSR), linear regression, stepwise regression, multivariate adaptive regression spline (MARS), ridge regression, least absolute shrinkage and selection operator (LASSO), elastic net, least-angle regression (LARS), probabilistic classifier, naïve Bayes classifier, binary classifier, linear classifier, hierarchical classifier, canonical correlation analysis (CCA), factor analysis, independent component analysis (ICA), linear discriminant analysis (LDA), multidimensional scaling (MDS), non-negative metric factorization (NMF), partial least squares regression (PLSR), principal component analysis (PCA), principal component regression (PCR), Sammon mapping, t-distributed stochastic neighbor embedding (t-SNE), bootstrap aggregating, ensemble averaging, gradient boosted decision tree (GBRT), gradient boosting machine (GBM), inductive bias algorithms, Q-learning, state-action-reward-state-action (SARSA), temporal difference (TD) learning, apriori algorithms, equivalence class transformation (ECLAT) algorithms, Gaussian process regression, gene expression programming, group method of data handling (GMDH), inductive logic programming, instance-based learning, logistic model trees, information fuzzy networks (IFN), hidden Markov models, Gaussian naïve Bayes, multinomial naïve Bayes, averaged one-dependence estimators (AODE), Bayesian network (BN), classification and regression tree (CART), chi-squared automatic interaction detection (CHAID), expectation-maximization algorithm, feed-forward neural networks, logic learning machine, self-organizing map, single-linkage clustering, fuzzy clustering, hierarchical clustering, Boltzmann machines, convolutional neural networks, recurrent neural networks, hierarchical temporal memory (HTM), and/or other machine learning techniques.

Figure 3:
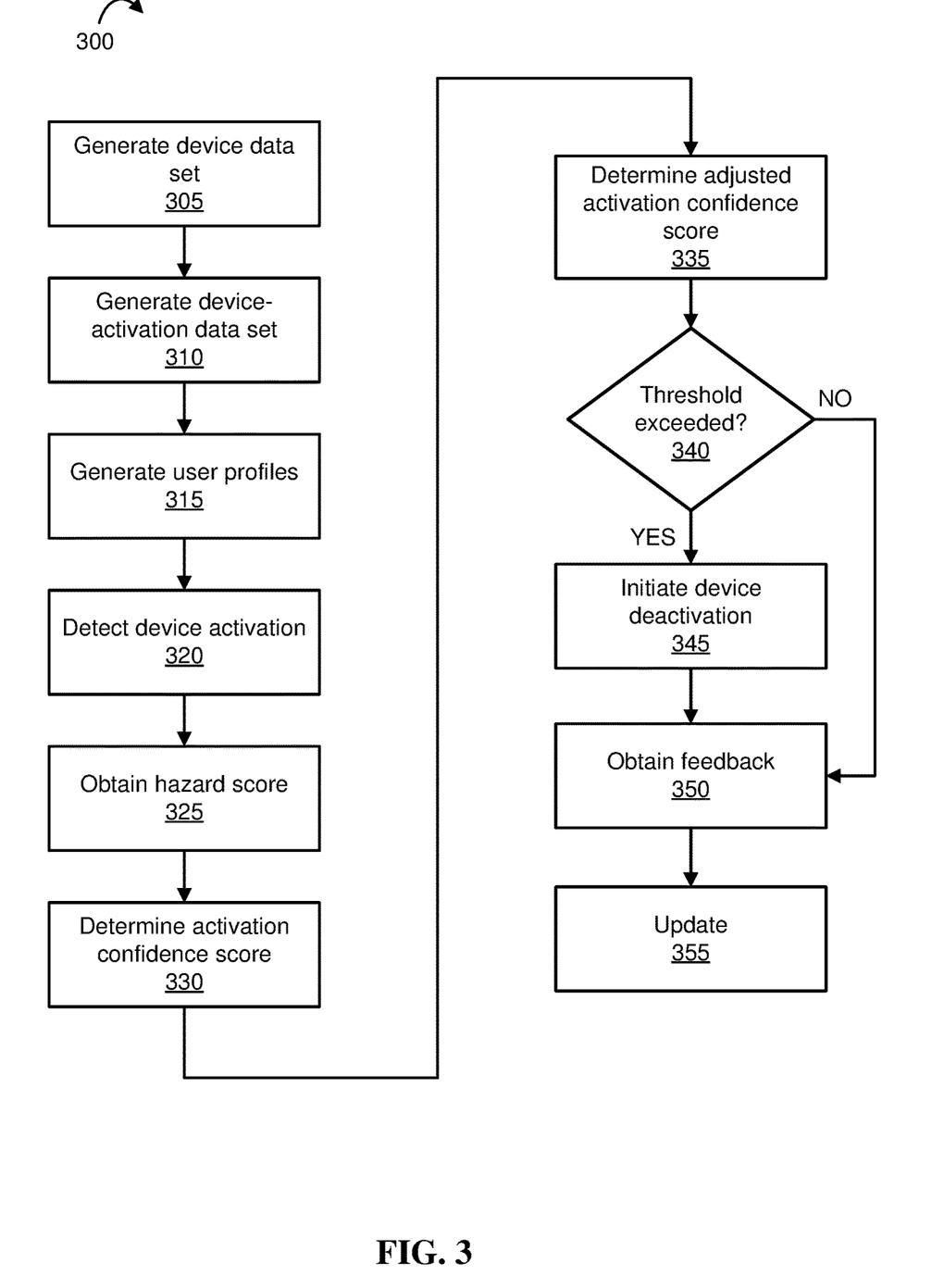
FIG. 3 depicts a flowchart of an example method for performing a device activation verification, in accordance with embodiments of the present disclosure.

FIG. 3 illustrates a flowchart of an example method 300 for performing a device activation verification, in accordance with embodiments of the present disclosure. The method 300 can be performed by an AVS, such as the AVS 140, FIG. 1 and/or the AVS 220, FIG. 2.

Referring back to FIG. 3, in operation 305 the AVS can generate one or more device data sets. In some embodiments, operation 305 can include the AVS obtaining device data (e.g., device data 205, FIG. 2) and generating the one or more device data sets (e.g., lists, tables, databases, spreadsheets, and the like) based on the device data. In some embodiments, the AVS can obtain such device data from one or more sources, such as a user device, server, and/or networked device (e.g., user device 110, server 120, networked device 130, FIG. 1). For example, in some embodiments, the AVS can obtain device data (e.g., specifications of a networked device) from a web server of a manufacturer of the networked device. In another example, in some embodiments, the AVS can obtain device data (e.g., a hazard score corresponding to a networked device) from a web server storing crowd-sourced data, such as crowd-sourced hazard scores corresponding to the networked device. In another example, in some embodiments, the AVS can obtain device data (e.g., a device name and/or model number) from the networked device.

In some embodiments, operation 310 can include the AVS generating one or more device-activation data sets. In some embodiments, operation 310 can include the AVS obtaining device-activation data (e.g., device-activation data 210, FIG. 2) and generating the one or more device-activation data sets based on the device-activation data. In some embodiments, the AVS can obtain such device-activation data from one or more sources, such as a user device, server, and/or networked device (e.g., user device 110, server 120, networked device 130, FIG. 1). For example, in some embodiments, the AVS can obtain device-activation data (e.g., data indicating that a networked garage door opener has just been manually activated) from the networked garage door opener. In another example, in some embodiments, the AVS can obtain device-activation data (e.g., historical data indicating the times of day during which the networked garage door opener has previously been activated) from a web server configured to store the device-activation data.

In some embodiments, operation 315 can include the AVS generating one or more user profiles. In some embodiments, operation 315 can include the AVS obtaining user data (e.g., user data 215, FIG. 2) and generating the one or more user profiles based on the user data. In some embodiments, the AVS can obtain such user data from one or more sources, such as a user device, server, and/or networked device (e.g., user device 110, server 120, networked device 130, FIG. 1). For example, in some embodiments, the AVS can obtain user data (e.g., data that indicates that a user, User A, manually activated a networked door lock) from a networked camera. In another example, in some embodiments, the AVS can obtain user data (e.g., data indicating that a user, User B, only performs network-based activations of User B's automobile ignition during the months of December, January, and February) from User B's mobile phone.

In operation 320, the AVS can detect an activation of a networked device. In some embodiments, operation 320 can include the AVS obtaining device-activation data. In some embodiments, the AVS can detect an activation of a networked device when the AVS obtains device-activation data.

In operation 325, the AVS can obtain one or more hazard scores (e.g., hazard score 235, FIG. 2) corresponding to one or more networked devices. In some embodiments, the AVS can obtain the one or more hazard scores from a resource, such as a web server of a device manufacturer and/or a web server of a crowd-sourcing entity. In some embodiments, the AVS can obtain the one or more hazard scores from user input into a user device. For example, in some embodiments, a user can input a selected hazard score corresponding to a networked device and transmit the selected hazard score to the AVS. In this way, embodiments of the present disclosure can permit a user to tailor method 300 according to the user's perceived degree of hazard associated with a networked device.

In some embodiments, operation 325 can include the AVS generating a hazard score. In some embodiments, the AVS can generate a hazard score based on device data. For example, in some embodiments, the AVS can assign a hazard score to a networked device based on a category of the networked device and/or one or more specifications of the networked device. For example, continuing with the example hazard scores of 1, 2, and 3 discussed above, the AVS can assign a hazard score of 1 to networked device categories such as lighting fixtures and televisions. Continuing with this example, the AVS can assign a hazard score of 3 to networked device categories such as door locks and heating devices. In another example, the AVS can assign a hazard score of 3 to networked devices having an operating temperature that can exceed 200 degrees Celsius.

In some embodiments, operation 330 can include the AVS determining an activation confidence score (e.g., activation confidence score 240, FIG. 2). In some embodiments, the AVS can determine the activation confidence score based on one or more of device data, device-activation data, and/or user data (e.g., device data 205, activation data 210, user data 215, FIG. 2). For example, in some embodiments the AVS can generate an activation confidence score based, at least in part, on a degree of difference between profile activation data and present activation data (e.g., an extent to which profile activation data and present activation data are dissimilar). For example, in some embodiments, profile activation data can indicate that a user typically activates a networked oven between 4 PM and 9 PM, and present activation data can indicate that the user has just activated the networked oven at 3 AM. Based on the present activation being at least 6 hours outside of the user's typical activation time, the AVS can generate an activation confidence score that indicates that the present activation is likely an unintended activation.

In some embodiments, operation 330 can include the AVS generating an activation score based, at least in part, on historical activation data. For example, in some embodiments, historical activation data can indicate that all unintended activations of a networked garage door opener were initiated by a tablet computer between the hours of 8 PM and 10 PM. In this example, present activation data can indicate that an activation of the networked garage door opener was initiated by the tablet computer at 9 PM. In this example, the AVS can generate an activation confidence score that indicates that the present activation is likely an unintended activation.

In some embodiments, operation 330 can include the AVS determining an activation confidence score based, at least in part, on one or more criteria and corresponding thresholds, scores, and weights. Such an example of the AVS determining an activation score, in accordance with embodiments of the present disclosure, can be described as follows.

In this example, the AVS can obtain present activation data from a mobile phone of a user, User C. The present activation data can indicate that User C just performed a network-based activation of a networked oven. The present activation data can also indicate that a User C performed the network-based activation at 5 PM from User C's office. The office can be located 10 kilometers (km) from User C's home, where the networked oven is located. Based on the present activation data, the AVS can locate a stored profile for User C (e.g., the AVS can match a user name of the present activation data with a user name of the stored profile).

Continuing with this example, based on profile activation data of the stored profile for User C, the AVS can identify that User C performs 85% of the total number of activations of the networked oven. Additionally, the AVS can identify that of the total number of network-based activations of the networked oven performed by a User C, User C performs 50% of the network-based activations from User C's mobile phone. Additionally, the AVS can identify that User C has frequently performed a network-based activation of the networked oven between 4 PM and 6 PM.

Continuing with this example, the AVS can determine an activation confidence score based on a total of a set of weighted criterion scores. For example, the AVS can assign a first criterion score of 0.9 in the case that a particular user performs more than 80% of the total number of activations of a particular networked device. Additionally, the AVS can assign a second criterion score of 0.2 in the case that a network-based activation of a networked device is performed from a distance between 5 km and 15 km from the networked device. Additionally, the AVS can assign a third criterion score of 0.5 in the case that a user device from which a particular user activates a particular networked device has been consistent for more than 40% of the activations. Additionally, the AVS can assign a fourth criterion score of 1 in the case that a particular user's networked based activation of a networked device occurs within a frequent range of activation times by that user.

Continuing with this example, each criterion score can have a corresponding weight value. For example, the first criterion score can have a weight of 15, the second criterion score can have a weight of 30, the third criterion score can have a weight of 35, and the fourth criterion score can have a weight of 20. Continuing with this example, the AVS can calculate a weighted criterion score by multiplying each criterion score by its corresponding weight. In this example, the first weighted criterion score can be 13.5, the second weighted criterion score can be 6, the third weighted criterion score can be 17.5, and the fourth weighted criterion score can be 20. Accordingly, in this example, the AVS can add the set of weighted criterion scores to calculate a total of 57. Thus, in this example, the activation confidence score is 57.

In some embodiments, in operation 335, the AVS can determine an adjusted activation confidence score (e.g., adjusted activation confidence score 245, FIG. 2). In some embodiments, the AVS can generate an adjusted activation confidence score based, at least in part, on the hazard score and the activation confidence score. In some embodiments, the AVS can generate an adjusted activation confidence score by multiplying the activation confidence score by the hazard score. In some embodiments, the AVS can determine an adjusted activation confidence score according to one or more predetermined data sets. For example, in some embodiments, the AVS can determine an adjusted activation confidence score according to a risk assessment matrix, such as that shown in TABLE 1 below.

TABLE 1

| Activation confidence score: | Hazard score = 1 | Hazard score = 2 | Hazard score = 3 |
| --- | --- | --- | --- |
| 75-100 | 1 | 4 | 4 |
| 50-75 | 3 | 6 | 6 |
| 25-50 | 4 | 7 | 8 |
| 0-25 | 5 | 9 | 10 |

TABLE 1 shows a risk assessment matrix that includes a set of adjusted activation confidence scores from 1 to 10. Based on the four shown ranges of activation confidence scores and the 3 shown hazard scores, the AVS can determine an adjusted activation confidence score from 1 to 10. For example, a networked device having a hazard score of 3 and an activation confidence score in the range of 25 to 50 would have an adjusted activation confidence score of 8.

In some embodiments, in operation 340, the AVS can compare the adjusted activation confidence score to a predetermined threshold. In some embodiments, the predetermined threshold can be selected by a user or included as a default value in programming instructions of the AVS. In some embodiments, the AVS can update the predetermined threshold as discussed below. If the AVS determines in operation 340 that the adjusted activation confidence score exceeds the predetermined threshold, then the AVS can proceed to operation 345. If the AVS determines in operation 340 that the adjusted activation confidence score does not exceed the predetermined threshold, then the AVS can proceed to operation 350.

In some embodiments, in operation 345, the AVS can initiate a deactivation of a networked device. In some embodiments, initiating a deactivation of a networked device can include the AVS issuing a command to deactivate (e.g., turn off) a networked device or to reverse or cancel an operation of the networked device. For example, in some embodiments, the AVS can initiate a deactivation of a networked oven by issuing a command to turn off the networked oven. In some embodiments, the command can be received by a controller of the networked oven, which can turn off the networked oven in response to the command. In another example, in some embodiments, the AVS can initiate a deactivation of a networked door lock by issuing a command to transition the door lock back to a locked position after it was unintentionally transitioned to an unlocked position. In another example, in some embodiments, the AVS can initiate a deactivation of a networked thermostat by issuing a command to cancel an unintentionally activated heating schedule so that the thermostat can revert to a regular programmed cooling schedule. In some embodiments, the AVS can initiate a deactivation of a networked device by stopping a power supply to the networked device.

In some embodiments, initiating a deactivation can include the AVS issuing a notification to one or more user devices to alert one or more users of a need to deactivate a networked device and/or that a networked device was deactivated. For example, in some embodiments, the AVS can include instructions to issue a notification to a user device any time the AVS deactivates a networked device having a particular hazard score, such as a hazard score of 3. In some embodiments, initiating a deactivation can include the AVS triggering an audio or visual alert on the networked device to notify one or more users of a need to deactivate the networked device.

In some embodiments, in operation 350, the AVS can obtain user feedback. In some embodiments, user feedback can include a user indicating to the AVS whether an activation was intended or unintended. For example, in some embodiments, in response to an electronic prompt and/or notification sent to a user device by the AVS in operation 345, the user can transmit a feedback message to the AVS indicating that an activation was intended. In some embodiments, the AVS can be configured to obtain user feedback by allowing a user to view data, such as profile activation data and/or historical activation data, and input to the AVS whether an activation was intended or unintended. In these embodiments, the AVS can update the profile activation data and/or the historical activation data as discussed below.

In some embodiments, in operation 355, the AVS can perform one or more updates. For example, in some embodiments, based on user feedback, the AVS can update data related to operations such as determining a hazard score, determining an activation confidence score, and/or determining an adjusted activation confidence score. For example, in some embodiments, one or more criteria, thresholds, scores and/or weights can be updated based on user feedback. In some embodiments, based on user feedback, the AVS can update data such as device data, device-activation data, and/or user data. In some embodiments, a machine learning module included in the AVS can update the aforementioned data and/or correlations corresponding to such data, based on the user feedback. In this way, the AVS can improve its accuracy in distinguishing intended activations from unintended activations.

Figure 4:
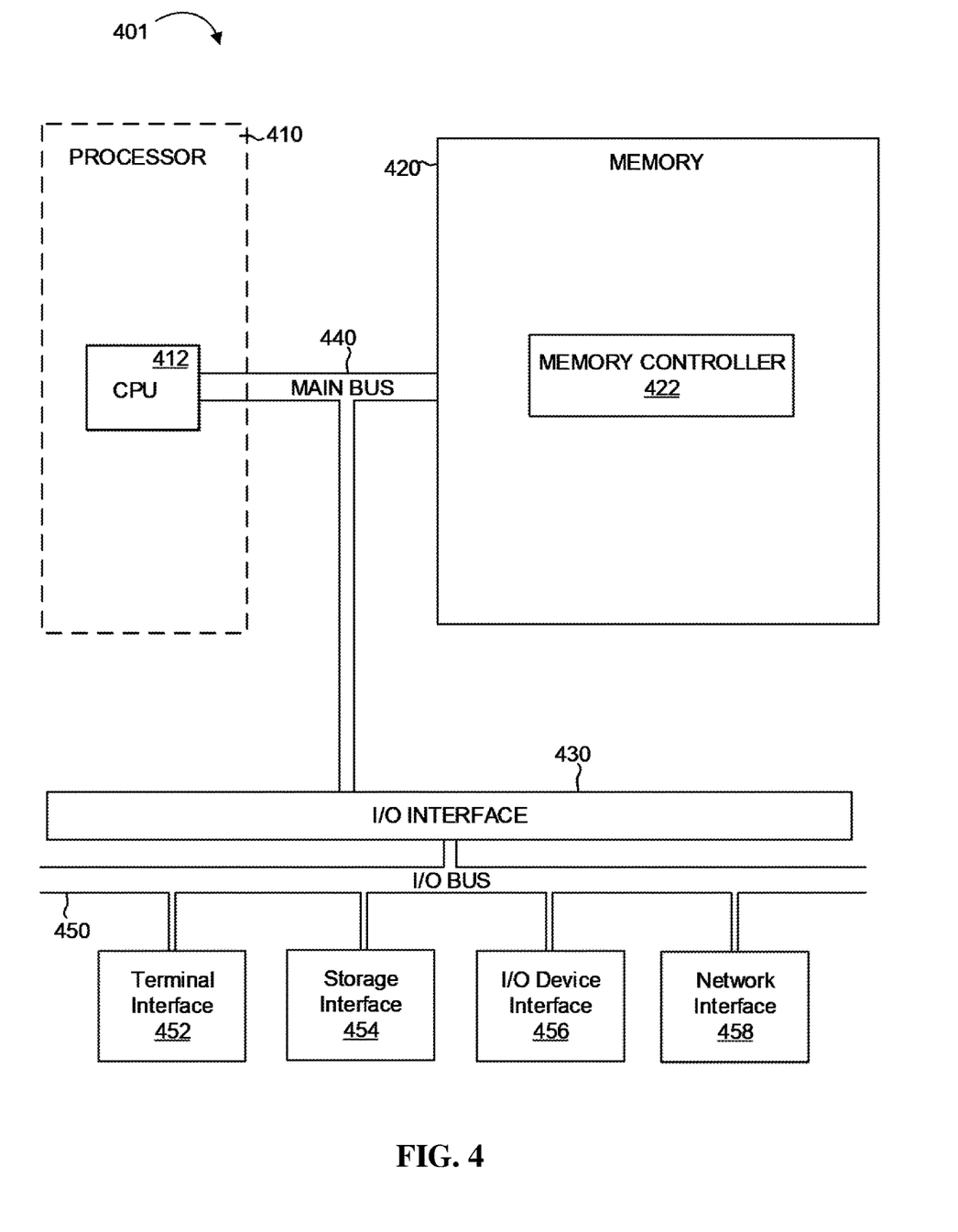
FIG. 4 depicts the representative major components of a computer system that can be used in accordance with embodiments of the present disclosure.

FIG. 4 depicts the representative major components of an exemplary Computer System 401 that can be used in accordance with embodiments of the present disclosure. The particular components depicted are presented for the purpose of example only and are not necessarily the only such variations. The Computer System 401 can comprise a Processor 410, Memory 420, an Input/Output Interface (also referred to herein as I/O or I/O Interface) 430, and a Main Bus 440. The Main Bus 440 can provide communication pathways for the other components of the Computer System 401. In some embodiments, the Main Bus 440 can connect to other components such as a specialized digital signal processor (not depicted).

The Processor 410 of the Computer System 401 can be comprised of one or more CPUs 412. The Processor 410 can additionally be comprised of one or more memory buffers or caches (not depicted) that provide temporary storage of instructions and data for the CPU 412. The CPU 412 can perform instructions on input provided from the caches or from the Memory 420 and output the result to caches or the Memory 420. The CPU 412 can be comprised of one or more circuits configured to perform one or methods consistent with embodiments of the present disclosure. In some embodiments, the Computer System 401 can contain multiple Processors 410 typical of a relatively large system. In other embodiments, however, the Computer System 401 can be a single processor with a singular CPU 412.

The Memory 420 of the Computer System 401 can be comprised of a Memory Controller 422 and one or more memory modules for temporarily or permanently storing data (not depicted). In some embodiments, the Memory 420 can comprise a random-access semiconductor memory, storage device, or storage medium (either volatile or non-volatile) for storing data and programs. The Memory Controller 422 can communicate with the Processor 410, facilitating storage and retrieval of information in the memory modules. The Memory Controller 422 can communicate with the I/O Interface 430, facilitating storage and retrieval of input or output in the memory modules. In some embodiments, the memory modules can be dual in-line memory modules.

The I/O Interface 430 can comprise an I/O Bus 450, a Terminal Interface 452, a Storage Interface 454, an I/O Device Interface 456, and a Network Interface 458. The I/O Interface 430 can connect the Main Bus 440 to the I/O Bus 450. The I/O Interface 430 can direct instructions and data from the Processor 410 and Memory 420 to the various interfaces of the I/O Bus 450. The I/O Interface 430 can also direct instructions and data from the various interfaces of the I/O Bus 450 to the Processor 410 and Memory 420. The various interfaces can comprise the Terminal Interface 452, the Storage Interface 454, the I/O Device Interface 456, and the Network Interface 458. In some embodiments, the various interfaces can comprise a subset of the aforementioned interfaces (e.g., an embedded computer system in an industrial application may not include the Terminal Interface 452 and the Storage Interface 454).

Logic modules throughout the Computer System 401—including but not limited to the Memory 420, the Processor 410, and the I/O Interface 430—can communicate failures and changes to one or more components to a hypervisor or operating system (not depicted). The hypervisor or the operating system can allocate the various resources available in the Computer System 401 and track the location of data in Memory 420 and of processes assigned to various CPUs 412. In embodiments that combine or rearrange elements, aspects of the logic modules' capabilities can be combined or redistributed. These variations would be apparent to one skilled in the art.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
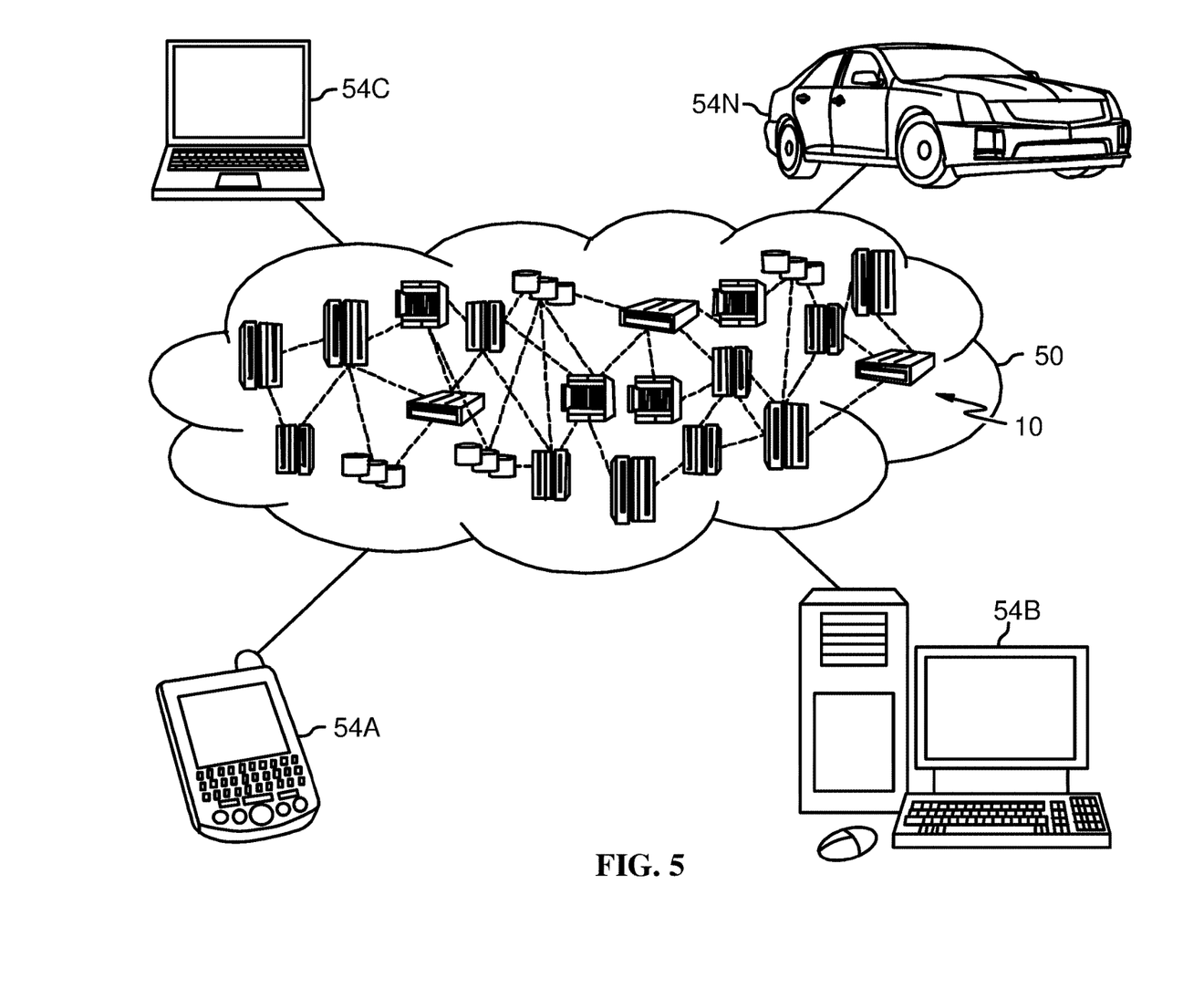
FIG. 5 depicts a cloud computing environment according to embodiments of the present disclosure.

Referring now to FIG. 5, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N can communicate. Nodes 10 can communicate with one another. They can be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
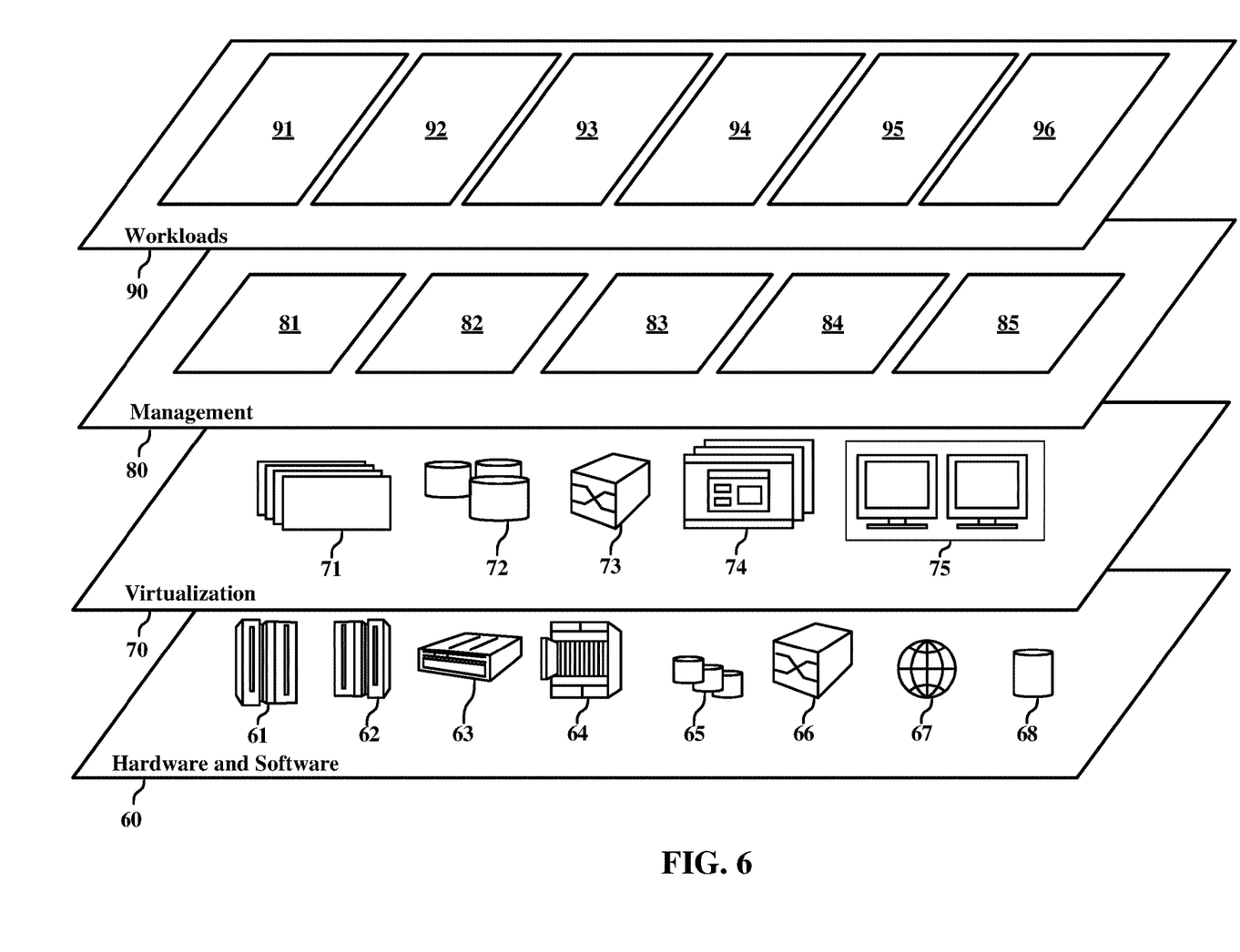
FIG. 6 depicts abstraction model layers according to embodiments of the present disclosure.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities can be provided: virtual servers 71; virtual storage 72; virtual networks 73, including virtual private networks; virtual applications and operating systems 74; and virtual clients 75.

In one example, management layer 80 can provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources can comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment can be utilized. Examples of workloads and functions which can be provided from this layer include: mapping and navigation 91; software development and lifecycle management 92; virtual classroom education delivery 93; data analytics processing 94; transaction processing 95; and device activation verification logic 96.

As discussed in more detail herein, it is contemplated that some or all of the operations of some of the embodiments of methods described herein can be performed in alternative orders or may not be performed at all; furthermore, multiple operations can occur at the same time or as an internal part of a larger process.

The present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method comprising:
detecting an activation of a networked device, the activation initiating an operation of the networked device;
obtaining a hazard score corresponding to a degree of hazard associated with the networked device;
obtaining historical activation data corresponding to at least one historical activation of the networked device, the historical activation data comprising:
an indication of a manual activation of the networked device, and
an indication of a network-based activation of the networked device;
determining an activation confidence score corresponding to the activation of the networked device, the activation confidence score being a numerical value and indicating a likelihood that the detected activation is an intended activation,
wherein determining the activation confidence score comprises calculating a sum of weighted criterion scores corresponding to the historical activation data;
determining, based at least in part on the hazard score and the activation confidence score, an adjusted activation confidence score;
determining that the adjusted activation confidence score exceeds a threshold; and
initiating a deactivation of the networked device in response to the determining that the adjusted confidence score exceeds the threshold.

2. The computer-implemented method of claim 1, further comprising obtaining profile activation data corresponding to one or more activations of the networked device by a user; and
wherein determining the activation confidence score further comprises calculating a weighted criterion score corresponding to the profile activation data.

3. The computer-implemented method of claim 2, further comprising obtaining present activation data; and
wherein determining the activation confidence score further comprises determining a degree of difference between the profile activation data and the present activation data.

4. The computer-implemented method of claim 3, wherein the present activation data comprises an indication that the detected activation is a manual activation; and
wherein the profile activation data comprises an indication of a network-based activation by the user.

5. The computer-implemented method of claim 1, further comprising obtaining one or more specifications of the networked device; and
wherein obtaining the hazard score comprises generating the hazard score based at least in part on the one or more specifications.

6. The computer-implemented method of claim 1, further comprising obtaining user feedback in response to initiating the deactivation; and
updating the historical activation data based on the user feedback.

7. The computer-implemented method of claim 1, wherein obtaining the hazard score comprises obtaining one or more hazard scores from a web server of a crowd-sourcing entity.

8. The computer-implemented method of claim 1, wherein obtaining the hazard score comprises obtaining the hazard score from a web server of a manufacturer of the networked device.

9. The computer-implemented method of claim 1, wherein obtaining the hazard score comprises obtaining the hazard score from a user selection.

10. The computer-implemented method of claim 1, wherein determining the adjusted activation confidence score comprises providing a risk assessment matrix.

11. The computer-implemented method of claim 1, further comprising generating a notification in response to determining that the adjusted activation confidence score exceeds the threshold.

12. The computer-implemented method of claim 1, wherein the deactivation comprises a command to end the operation.

13. A system comprising:
a processor; and
a memory in communication with the processor, the memory containing program instructions that, when executed by the processor, are configured to cause the processor to perform a method, the method comprising:
detecting an activation of a networked device, the activation initiating an operation of the networked device;
obtaining a hazard score corresponding to a degree of hazard associated with the networked device;
obtaining historical activation data corresponding to at least one historical activation of the networked device, the historical activation data comprising:
an indication of a manual activation of the networked device, and
an indication of a network-based activation of the networked device;
determining an activation confidence score corresponding to the activation of the networked device, the activation confidence score being a numerical value and indicating a likelihood that the detected activation is an intended activation,
wherein determining the activation confidence score comprises calculating a sum of weighted criterion scores corresponding to the historical activation data;
determining, based at least in part on the hazard score and the activation confidence score, an adjusted activation confidence score;
determining that the adjusted activation confidence score exceeds a threshold; and
initiating a deactivation of the networked device in response to the determining that the adjusted confidence score exceeds the threshold.

14. The system of claim 13, the method further comprising obtaining profile activation data corresponding to one or more activations of the networked device by a user; and
wherein determining the activation confidence score further comprises calculating a weighted criterion score corresponding to the profile activation data.

15. The system of claim 14, the method further comprising obtaining present activation data; and wherein determining the activation confidence score further comprises determining a degree of difference between the profile activation data and the present activation data.

16. The system of claim 15, wherein the present activation data indicates that the detected activation is a manual activation; and wherein the profile activation data comprises an indication of a network-based activation by the user.

17. The system of claim 13, the method further comprising obtaining one or more specifications of the networked device; and
wherein obtaining the hazard score comprises generating the hazard score based at least in part on the one or more specifications.

18. The system of claim 13, the method further comprising obtaining user feedback in response to initiating the deactivation; and
updating the historical activation data based on the user feedback.

19. A computer program product comprising a computer readable storage medium having program instructions embodied therewith, the program instructions executable by a processor to cause the processor to perform a method, the method comprising:
detecting an activation of a networked device, the activation initiating an operation of the networked device;
obtaining a hazard score corresponding to a degree of hazard associated with the networked device;
obtaining historical activation data corresponding to at least one historical activation of the networked device, the historical activation data comprising:
an indication of a manual activation of the networked device, and
an indication of a network-based activation of the networked device;
determining an activation confidence score corresponding to the activation of the networked device, the activation confidence score being a numerical value and indicating a likelihood that the detected activation is an intended activation,
wherein determining the activation confidence score comprises calculating a sum of weighted criterion scores corresponding to the historical activation data;
determining, based at least in part on the hazard score and the activation confidence score, an adjusted activation confidence score;
determining that the adjusted activation confidence score exceeds a threshold; and
initiating a deactivation of the networked device in response to the determining that the adjusted confidence score exceeds the threshold.

20. The computer program product of claim 19, the method further comprising obtaining profile activation data corresponding to one or more activations of the networked device by a user; and
wherein determining the activation confidence score further comprises calculating a weighted criterion score corresponding to the profile activation data.

* * * * *